United States Patent
Morris et al.

(10) Patent No.: US 10,159,223 B2
(45) Date of Patent: Dec. 25, 2018

(54) WINDROWER MACHINE

(75) Inventors: Jason Morris, Tifton, GA (US);
Charles Sumner, Tifton, GA (US);
Bennie Branch, Tifton, GA (US)

(73) Assignee: Kelley Manufacturing Co., Tifton, GA (US)

(*) Notice: Subject to any disclaimer, the term of this patent is extended or adjusted under 35 U.S.C. 154(b) by 581 days.

(21) Appl. No.: 13/271,815

(22) Filed: Oct. 12, 2011

(65) Prior Publication Data
US 2013/0092095 A1   Apr. 18, 2013

(51) Int. Cl.
*A01K 31/04* (2006.01)
*A01D 57/00* (2006.01)
*A01B 43/00* (2006.01)
*A01K 31/00* (2006.01)

(52) U.S. Cl.
CPC ............ *A01K 31/04* (2013.01); *A01B 43/005* (2013.01); *A01D 57/00* (2013.01); *A01K 31/007* (2013.01); *Y02A 40/294* (2018.01)

(58) Field of Classification Search
CPC ........ A01D 57/12; A01D 57/18; A01D 57/26; A01D 57/28; A01D 57/30; A01D 76/00; A01D 80/02; A01K 31/04
USPC .......... 119/442, 451, 161, 174; 56/155, 156, 56/158, 161, 164, 165, 167, 153, 192, 56/194
See application file for complete search history.

(56) References Cited

U.S. PATENT DOCUMENTS

| | | | | |
|---|---|---|---|---|
| 3,438,183 A * | 4/1969 | Puretic | ............................ | 56/16.1 |
| 3,662,420 A * | 5/1972 | Jordan, Jr. | ..................... | 15/93.3 |
| 3,777,460 A * | 12/1973 | Mokros | .......................... | 56/16.7 |
| 4,406,113 A * | 9/1983 | Mullins | ....................... | 56/400.16 |
| 4,550,554 A * | 11/1985 | Lundahl et al. | ................ | 56/294 |
| 4,637,201 A * | 1/1987 | Pruitt | ..................... | A01D 43/10 56/14.5 |
| 4,671,051 A * | 6/1987 | Klinner | ....................... | 56/16.4 R |
| 5,305,586 A * | 4/1994 | Lundahl et al. | ............... | 56/14.4 |
| 5,778,644 A * | 7/1998 | Keller | .................. | A01D 41/142 56/11.2 |
| 6,058,688 A * | 5/2000 | Krambeck | ........... | A01D 61/008 56/10.2 R |
| 6,467,432 B1 | 10/2002 | Lewis et al. | | |
| 6,820,358 B1 * | 11/2004 | Huelsewiesche | ............... | 37/407 |
| 8,740,117 B1 * | 6/2014 | Zimmerman | .......... | 241/101.762 |
| 2006/0090440 A1 * | 5/2006 | Gullickson | .................... | 56/13.9 |
| 2010/0074797 A1 | 3/2010 | Brown et al. | | |

* cited by examiner

*Primary Examiner* — Lisa L Tsang
(74) *Attorney, Agent, or Firm* — Laurence P. Colton; Smith Tempel Blaha LLC

(57) ABSTRACT

A windrower machine having a pair of forward rotating augers mounted in parallel with one another in overlapping relationship with one another to work in conjunction with a blade and a backstop to form windrows to disrupt and reduce caked material to particulate in windrows as said machine is moved forwardly through a work area.

5 Claims, 11 Drawing Sheets

WINDROWER MACHINE

BACKGROUND OF THE INVENTION

The present invention relates to the field of agriculture and more specifically to apparatus used by poultry farmers to properly sanitize chicken farms in an economically efficient manner by windrowing poultry litter. More particularly, the present invention relates to the field of windrower machines for use in the poultry industry. In even greater particularity the present invention is a windrower machine having a first and second auger in which the flighting overlaps, creating a more efficient windrower apparatus. In even greater particularity, the present invention is a windrowing machine for use with a prime mover.

Chicken mortality rates in broiler houses are a great concern to the poultry industry. Large numbers of chickens living in close quarters present several challenges to the growers, from high ammonia levels, disease and harmful bacteria outbreaks, and beetle infestations. One method used to control these problems is windrowing the chicken litter in between flocks. Previous methods called for the top layer of the litter, referred to as cake because it is clumped together, to be removed in between catching out the adult birds and bringing in the new juvenile birds. However, recent research has shown that the cake layer does not exclusively contain most of the ammonia and harmful bacteria as previously believed. Leaking water lines, in addition to chicken excrement, can seep through the litter to a bottom layer, the clay pad, where it becomes trapped, forming a hardpan. The hardpan is warm and moist, forming the perfect environment for harmful bacteria and disease.

The developing method to address the threat of bacteria and disease is to windrow the particulate material. When the wet litter is piled into windrows, heat builds up that kills harmful bacteria and nuisance bugs. The heat also helps to dry the litter, and exposing the floor dries the floor as well. The hardpan and cake are broken into smaller pieces releasing ammonia and destroying bacteria habitat. At the end of the process the litter should be dry, relatively clump free, and ready for new birds. Windrowing has already proven to be successful in raising healthier chickens, but is more labor intensive and time consuming than previous practices.

Windrowing machines that have been previously developed have limitations. Many of the machines move slowly to prevent strain caused by the load of the build up of poultry litter. Others fail to properly break up the poultry litter in a single pass, requiring more than one pass for each windrow. All of these limitations increase the time and labor needed to properly windrow poultry in broiler houses. Therefore, a more efficient and effective means for windrowing is needed.

SUMMARY OF THE PRESENT INVENTION

These and other objects and advantages of the invention will become apparent from the following detailed description of the preferred embodiment of the invention.

BRIEF DESCRIPTION OF THE DRAWINGS

The windrower machine is depicted in the accompanying drawings which form a portion of this disclosure and wherein.

DESCRIPTION OF THE PREFERRED EMBODIMENT

Referring to the FIGS. 1-11 for a clearer understanding of the invention, embodiments of the invention provide a windrower machine with two rotating shafts carrying radial extensions intermeshed to sufficiently break up poultry litter, including the hardpan and cake layers, while forming windrows of sufficient size and shape to generate temperatures within the poultry litter capable of killing harmful bacteria and nuisance bugs. While the embodiments of the windrower machines discussed are for use in the poultry industry, the windrow machines are in no way limited to such use. The windrow machines may be used for formation of windrows of other organic particulates such as compost, wood shavings, rice and peanut hulls, and other small particulates.

FIGS. 1-4 illustrate a windrower machine 10 according to one embodiment of the present invention. The windrower machine 10 as depicted is configured to be connected to and carried by a prime mover, including, but not limited to, tractors, skidders and other agricultural vehicles. The embodiment shown in FIGS. 1-4 is configured to be attached to a tractor 20 through the windrower machine's mounting system 100. However, in other embodiments, the windrower machine may be configured to be self-powered and operated.

Figure 2:
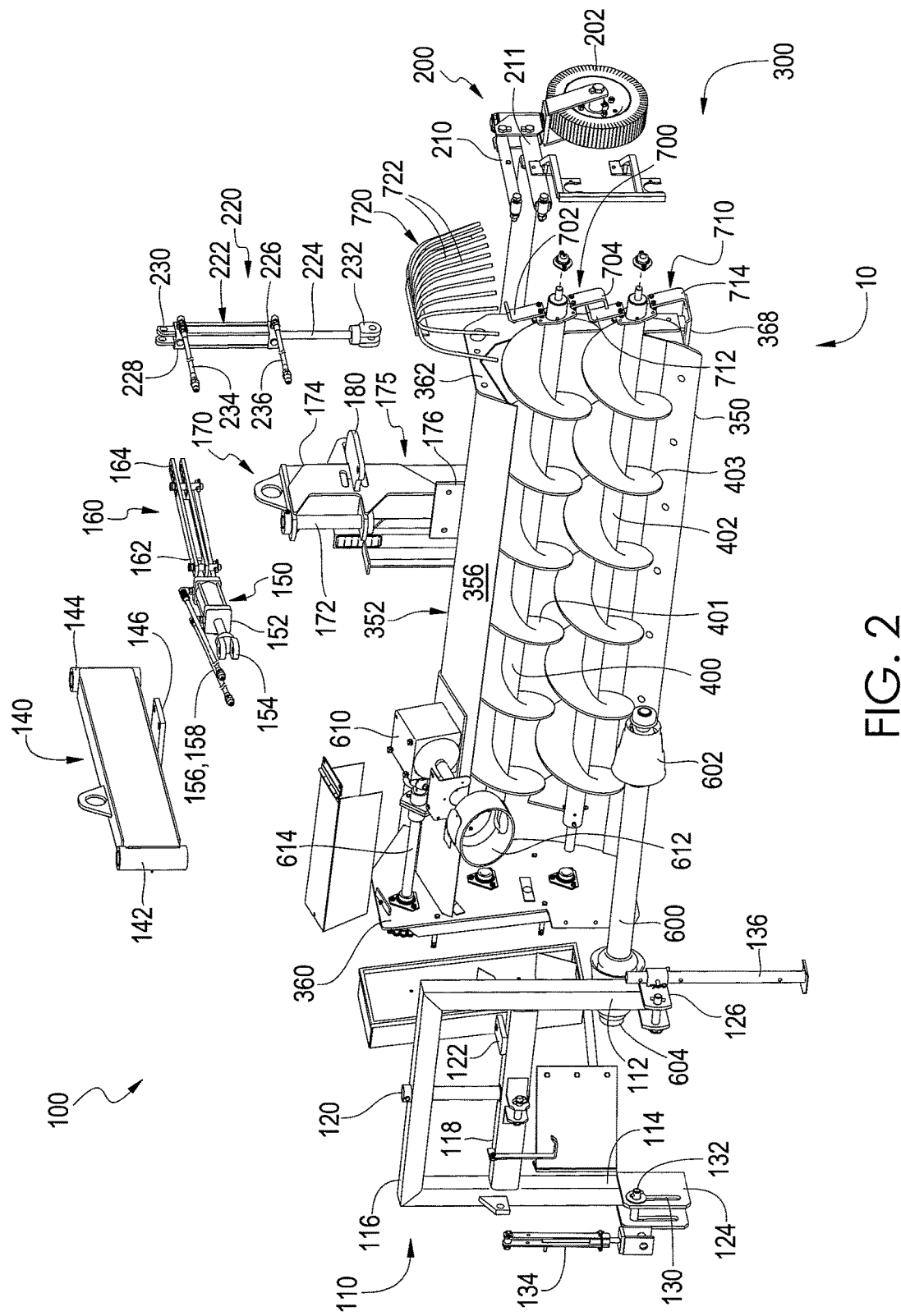
FIG. 2 is an exploded front-perspective view of the embodiment illustrated in FIG. 1.
Figure 3:
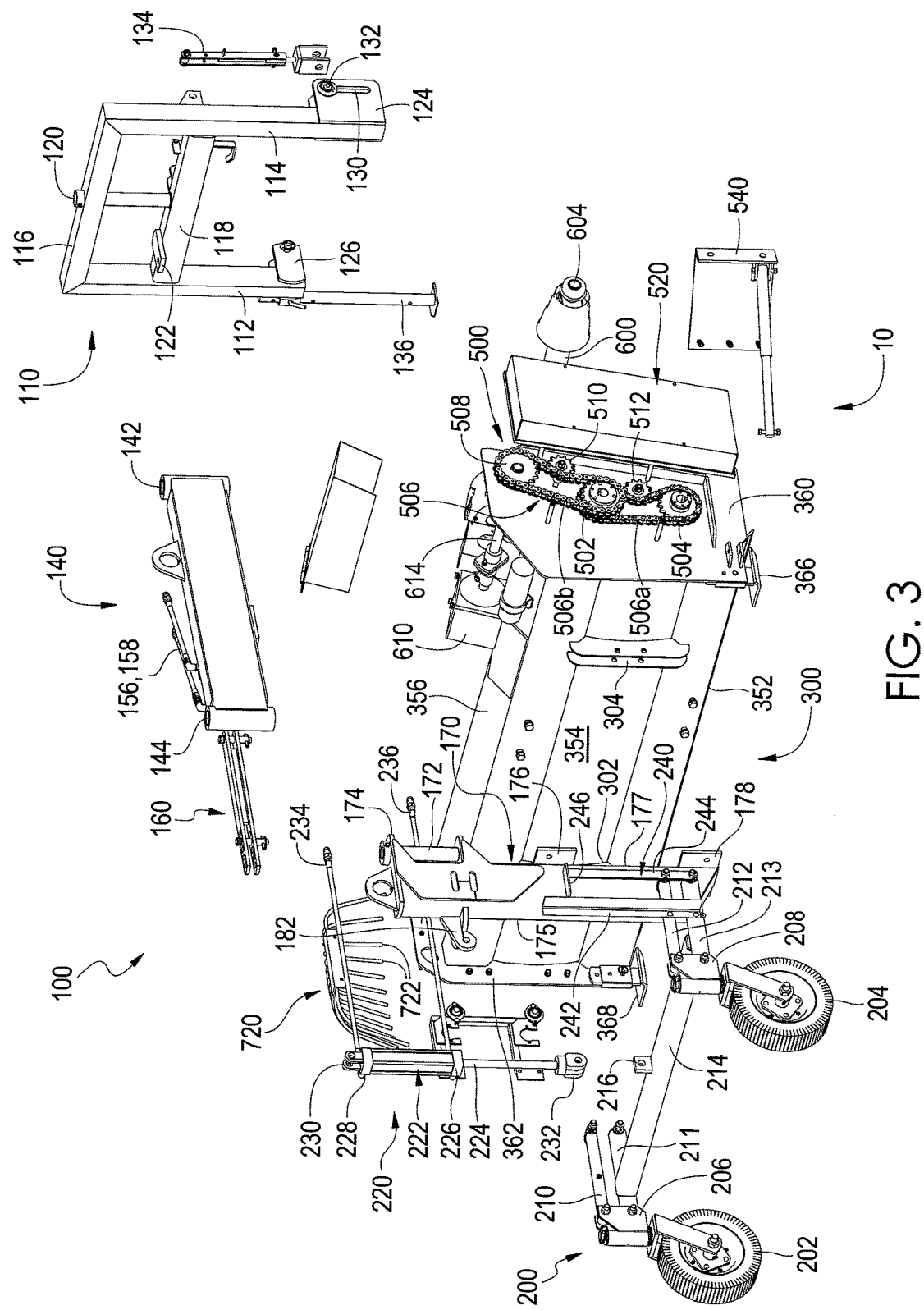
FIG. 3 is an exploded back-perspective view of the embodiment illustrated in FIG. 1.
Figure 4:
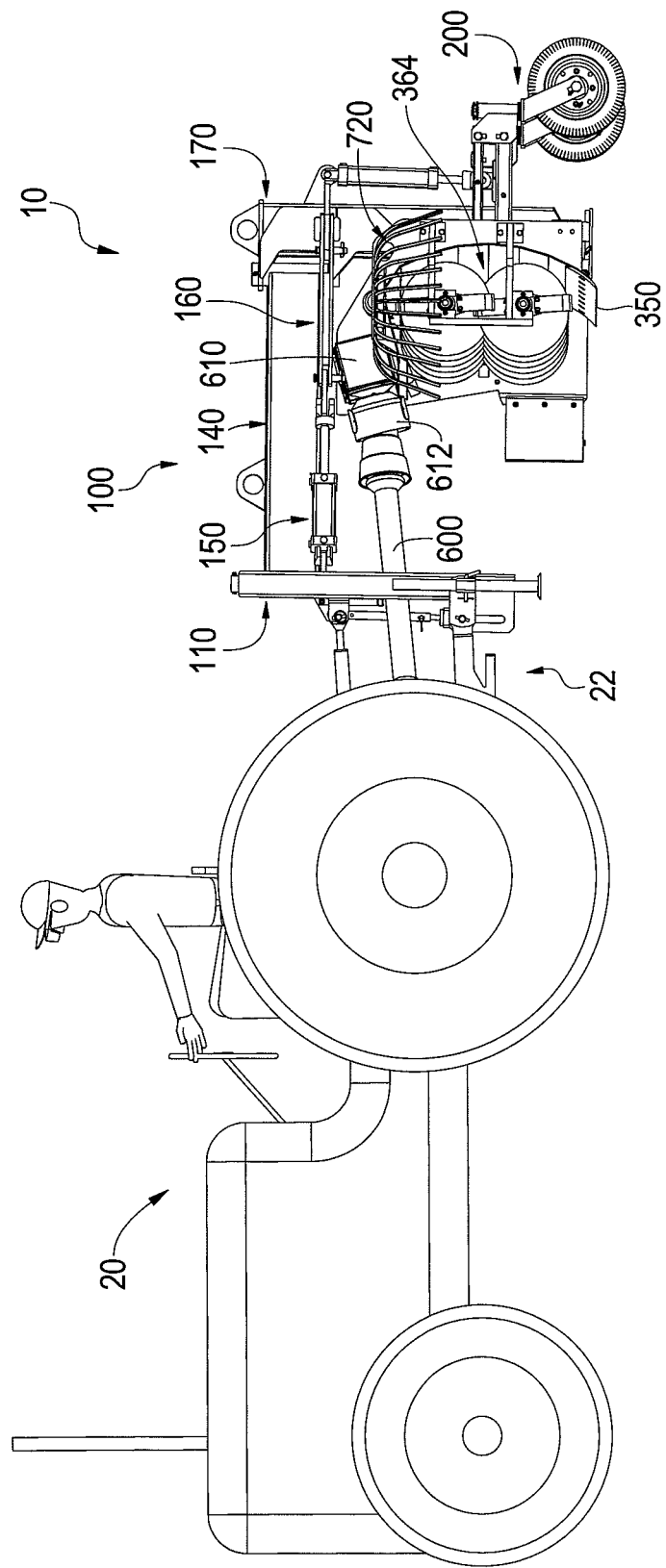
FIG. 4 is a perspective view of the embodiment illustrated in FIG. 1 engaged with a prime mover.

As shown in FIGS. 1-4, the mounting system 100 includes a hitch frame 110 for engaging a standard three-point lift of an associated tractor 20, an arm 140, and a mounting member 170. The hitch frame 110 is defined by a pair of vertical members 112 and 114 secured at their upper portions by a pair of horizontal members 116 and 118. A cylindrical post 120 is secured between the two horizontal members 116 and 118, which provides a pivot connection for the arm 140. One of the members 118 may include a pivot mount 122, which is discussed below. Mounting hinges or clevis' 124 and 126 are mounted at the lower ends of the vertical members 112 and 114 that are configured to be pivotably coupled to the tractor lifts 22 of the tractor 20, as shown in FIG. 4. One of the hinges 124 includes an elongated slot 130 and sliding pin 132 which allows the windrower machine 10 to remain in contact with the ground over uneven surfaces, which will be explained in further detail below. A bracket 134 ensures that the sliding pin 132 remains level as the sliding pin 132 travels within the elongated slot 130. The frame 110 includes a stand 136 that is pivotably mounted to one of the vertical members 112, which keeps the windrower machine 10 level when disconnected from the prime mover 20.

As discussed above, an arm 140 is connected to the frame 110. The arm 140 includes a cylindrical sleeve 142 at one end that receives the cylindrical post 120 of the frame 110 to form a pivotable connection between the two. Another cylindrical sleeve 144 found at the opposite end of the arm 140 provides a pivotable connection to the mounting member 170, discussed further below. The arm 140 also includes a flange 146 that provides a mounting surface for an alignment system 150. The alignment system 150 includes at least one hydraulic cylinder or linear actuator 152 and an adjustable bracket 160. The hydraulic cylinder 152 includes a piston 154 at one end that is pivotably connected to the pivot mount 122 of the frame 110. The other end of the hydraulic cylinder 152 is pivotably connected to the flange 146 on the arm 140. The hydraulic cylinder 152 includes hydraulic hoses 156, 158 configured to be connected to a conventional source of hydraulic pressure provided by the tractor 20. The hydraulic cylinder 152 can be actuated to vary the alignment of arm 140 to frame 110. Where only one cylinder 152 is to be used an adjustable bracket 160 is configured to be pivotably mounted to both the flange 146 of the arm 140 and the mounting member 170 to establish selectable alignment of mounting member 170 to the arm 140. The adjustable bracket 160 includes removable pins 162 and 164 that can be inserted within several apertures found along the length of the bracket 160 to be mounted to the arm 140 and mounting member 170 respectively in various positions.

The mounting member 170 includes a cylindrical member 172 at its upper end 174 that is received by one of the cylindrical sleeves 144 of the arm 140 to form a pivoting connection between the two. A horizontal flange 180 associated with the upper end 174 includes an aperture that receives one of the removable pins 164 to pivotably secure the adjustable bracket 160 to the mounting member 170. The upper end 174 of the mounting member 170 also includes a vertical flange 182, which is discussed below. The mounting member's middle 175 and lower 177 sections include a pair of brackets 176 and 178 that couple the mounting member 170 to the main body 300 of the windrower machine 10. The mounting member 170 can be fixed to the backside of the main body 300 through various fastening means. The alignment system 150, by being connected to both the frame 110, the arm 140, and the mounting member 170, allows the user to control the pitch or angle of the main body 300 as it is drawn by the prime mover 20.

A gauge wheel system 200 further supports the main body 300 of the windrower machine. The gauge wheel system includes a pair of casters 202, 204. Each caster 202, 204 includes hinges 206, 208 that are each pivotably connected to a pair of parallel members 210, 211, 212, 213 at one end. The parallel members 210, 211, 212, and 213 are pivotably connected at their respective other ends to mounting brackets 302 (as shown in FIG. 3) coupled to the back side of the main body 300. A horizontal member 214 is fastened between the lower members 210, 212 connected to each hinge 206, 208. The horizontal member 214 includes a connecting means 216. As shown in FIG. 3, the connecting means 216 is a flange extending from a surface of the horizontal member 214. However, connecting means 216 may include, but is not limited to, internal cylinders, pins, and the like. The connecting means 216 is configured to pivotably connect to a height adjustment mechanism 220.

Figure 1:
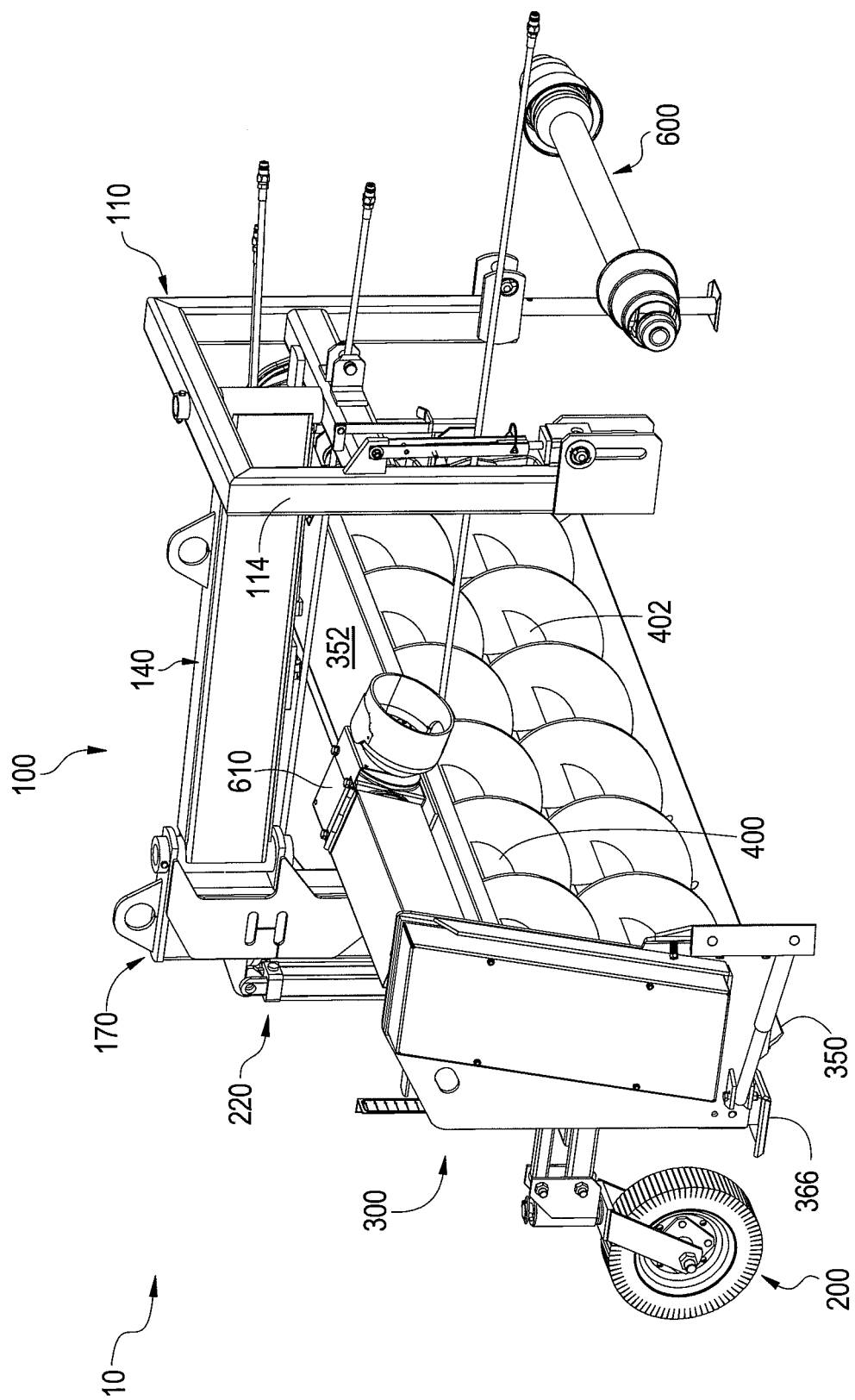
FIG. 1 is a perspective view of a windrower machine according to one embodiment of the present invention.

The height adjustment mechanism 220 as depicted in FIGS. 1-3 includes at least one hydraulic cylinder 222, and a piston 224 extending from an end 226 of the hydraulic cylinder 222. The other end 228 of the hydraulic cylinder 222 is equipped with a hinge 230. The cylinder's hinge 230 is configured to be pivotably connected to the vertical flange 182 of the mounting member 170. Further, the piston 224 includes a hinge 232 that is configured to be pivotably connected to the connecting means 216 of the horizontal member 214. The hydraulic cylinder 224 also includes hydraulic hoses 234, 236 configured to engage the corresponding connections of the tractor 20. A clearance gauge 240 is included in the height adjustment mechanism 220. As shown in FIGS. 1-4, the clearance gauge 240 comprises a pair of vertical members 242, 244, pivotally attached to one pair of parallel members 210, 211. One of the vertical members 244 can include vertically arranged numbers that correspond to the distance between the ground and the bottom of the main body 300 of the windrower machine 10. The other member 242 includes an indicator flange 246. When activated by controls found on the tractor, the hydraulic cylinder 222 extends or retracts the piston 224, lowering or lifting the main body 300 of the windrower machine 10 by lowering or lifting the gauge wheels. The indicator flange 246 displays the distance, or clearance, between the bottom of windrower machine 10 and the ground.

The main body 300 of the windrower machine 10 includes a long blade 350 removably coupled to the bottom of a backstop 352. The blade 350 is configured to break through hardened particulate material, such as the cake and hardpan typically found inside chicken houses. After dulling, the blade 350 can be removed from the backstop 352 and flipped over and reattached to expose the other sharpened side of the blade, or replaced with a new sharpened blade. The blade 350 can be placed in numerous positions and directions by the user through the combination of the other elements discussed above. For example, the blade can be titled forward or backward, increasing or decreasing the angle between the blade 350 and the ground, by the user lowering or raising the tractor lifts 22 attached to the three-point frame 110. The pitch of the blade 350 can be changed by adjusting and/or engaging the alignment system 150, as well as the position of the blade 350 in relation to the tractor. Further, the clearance between the blade 350 and the ground can be adjusted by engaging the height adjustment mechanism 220. These adjustments allow the operator to have complete control in positioning the blade 350 of the windrower 10 that is best suited for their needs.

As the windrower 10 moves forward, the blade 350 directs the particulate material to a vertical portion 354 of the backstop 352. The backstop 352, as the name indicates, prevents the particulate material from exiting the rear of the windrower machine 10, and forces the particulate material to exit at one side due to the alignment of the body 300 relative to the tractor 20. The curvature of the vertical portion 354 urges the particulate material to flow up the backstop 352 and back over itself once it reaches the top as the windrower machine 10 moves forward, easing the load put on the windrower machine 10. As illustrated in FIGS. 1-3 and 8, the vertical portion 354 of the backstop 352 is curved, or bent, at approximately 20° every 3 to 4 inches. However, the vertical portion 354 can be curved at a greater or lesser ratio in other embodiments. In some embodiments, the vertical portion 354 may have no curve. An overhang portion 356 extending from the top of the vertical portion 354 prevents any particulate material form exiting over the backstop 352. End caps 360, 362 are affixed to and form the sides of the backstop 352 and further assist in directing the particulate material in exiting the windrower machine 10, with one end cap 360 completely enclosing one side. The other end cap 362 provides a specific exit point 364 for the particulate material from the windrower machine 10. Skid plates 366, 368 may be associated with each end cap 360, 362.

Significantly, the windrower machine 10 also employs a pair of driven shafts 400, 402 with radial extensions 401, 403 that assist in displacing particulate material from the main body 300 into windrows more efficiently. The shafts are 400, 402 are rotatably mounted in a substantially parallel relationship with each other between the end caps 360, 362 in front of the vertical portion 354 of the backstop 352 and above the blade 350, with one shaft 400 aligned vertically over the other shaft 402. As shown, the upper shaft 400 is aligned directly above the lower shaft 402. However, in other embodiments of the present invention, the upper shaft may be vertically aligned above the lower shaft at an offset.

Figure 5:
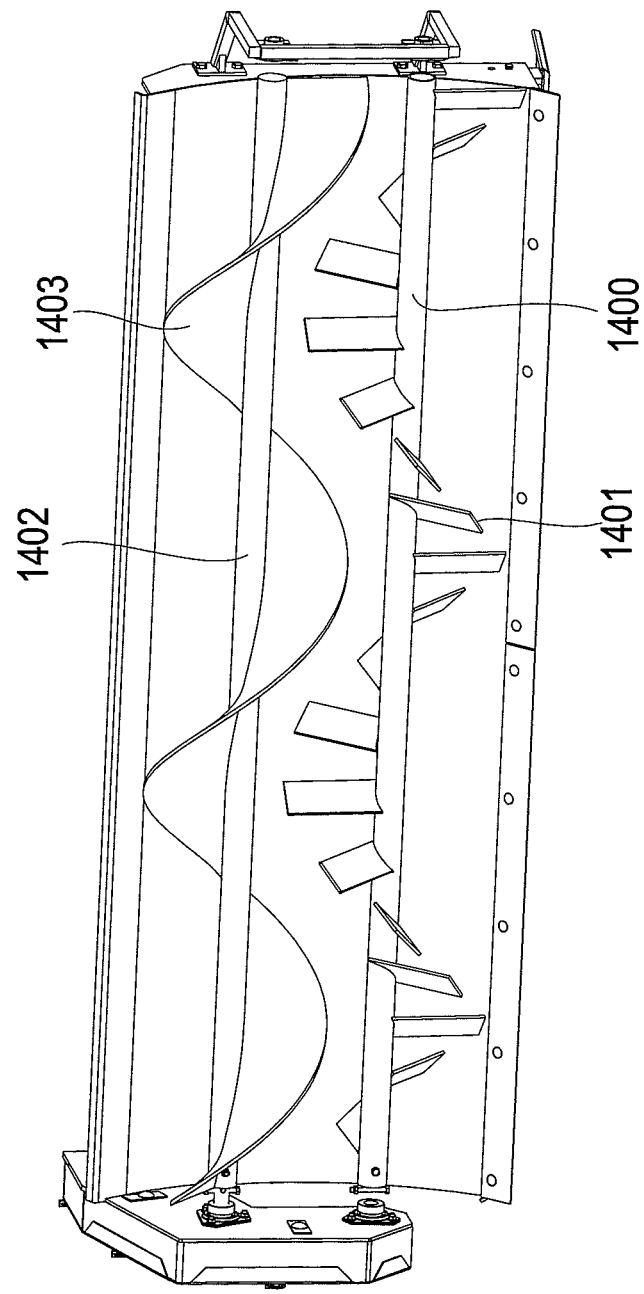
FIG. 5 is a perspective view of a windrower machine according to another embodiment of the present invention.
Figure 6:
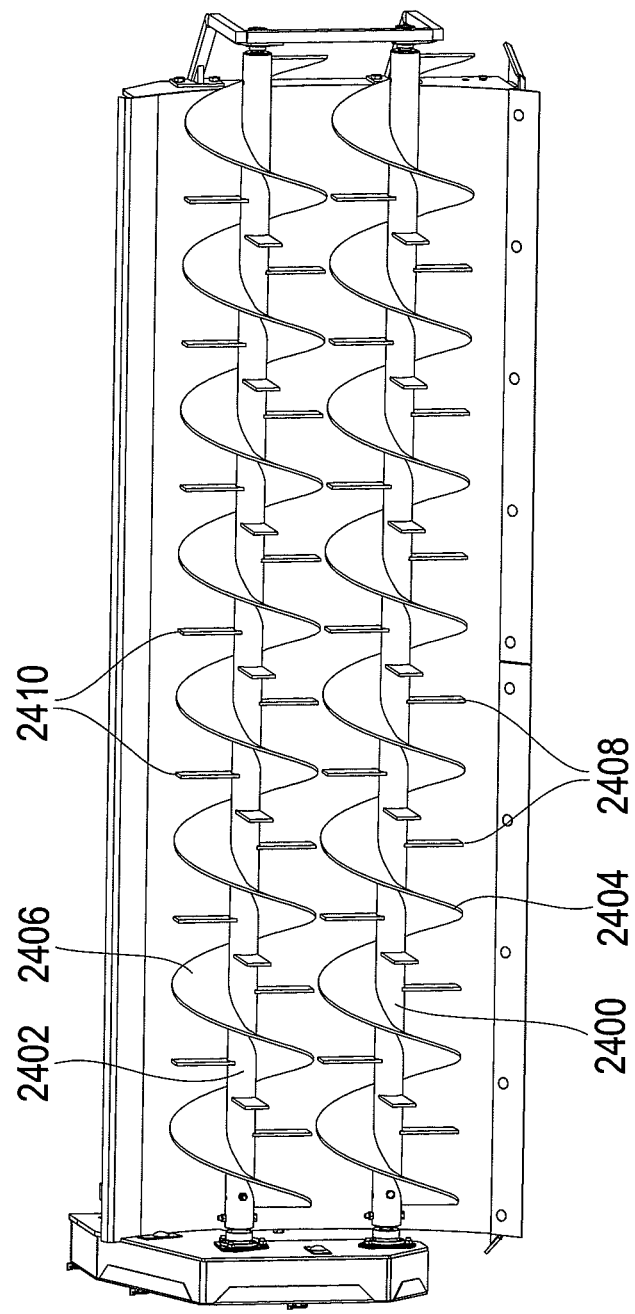
FIG. 6 is a perspective view of a windrower machine according to another embodiment of the present invention.
Figure 7:
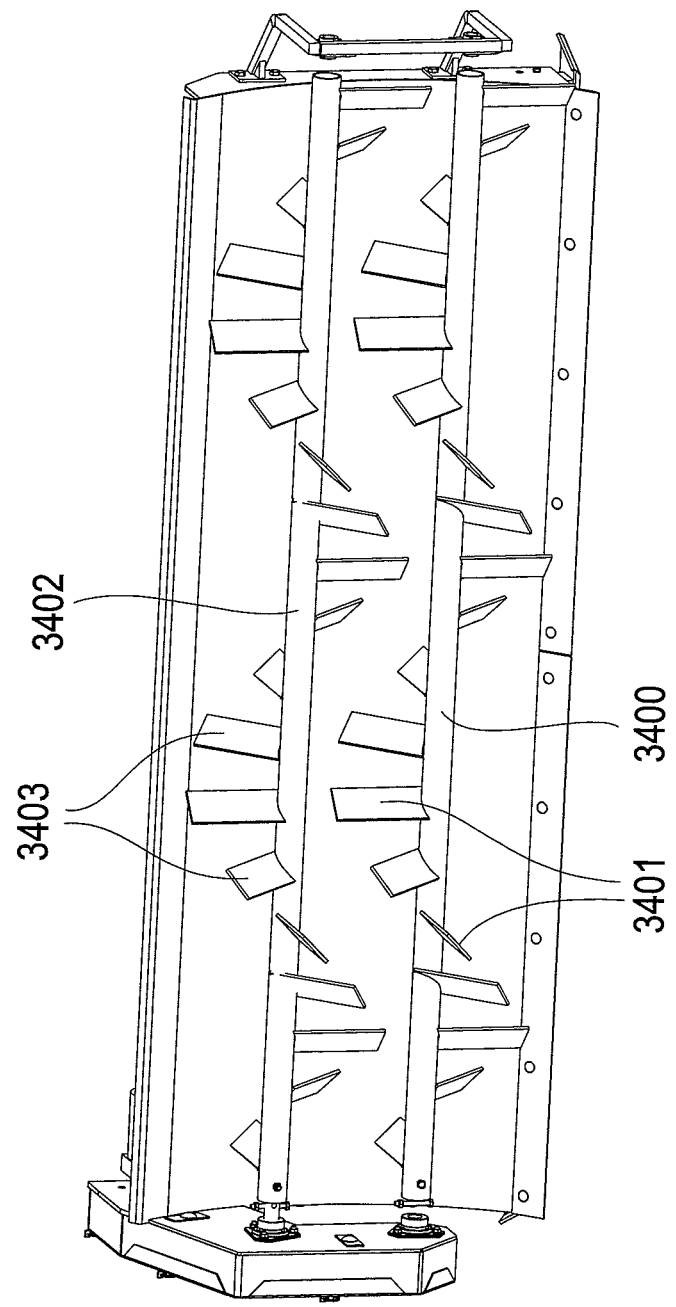
FIG. 7 is a perspective view of a windrower machine according to another embodiment of the present invention.

As shown in FIGS. 1-4, the shafts 400, 402 with the radial extensions include fighting 401, 403 that runs in the same direction, helically wrapping the shaft, defining a pair of augers. The current embodiment of the present invention uses standard augers, which have a diameter of 14 inches and flighting that completes a full rotation around the axle of the auger every 14 inches. However, augers of varying diameter and fighting rotations may be used. In addition, the apparatus is not limited to augers. For example, as illustrated in FIG. 5, a windrower machine may use a shaft 1400 with paddles 1401 in combination with an auger 1402 with flighting 1403. Further, the windrower may use shafts 2400, 2402 that utilize a combination of flighting 2404, 2406 and paddles 2408, 2410, as shown in FIG. 6 or use shafts 3400, 3402 that utilize paddles 3401, 3403 extending radially from the shafts as shown in FIG. 7. Embodiments of the present invention may utilize a variety of rotatable elements with radial extensions, which include, but are not limited to, spikes, blades, and other similar extensions. Therefore, it is understood that the term auger is interchangeable with shaft, and the term flighting is interchangeable with rotational extensions in further discussions below.

Figure 8:
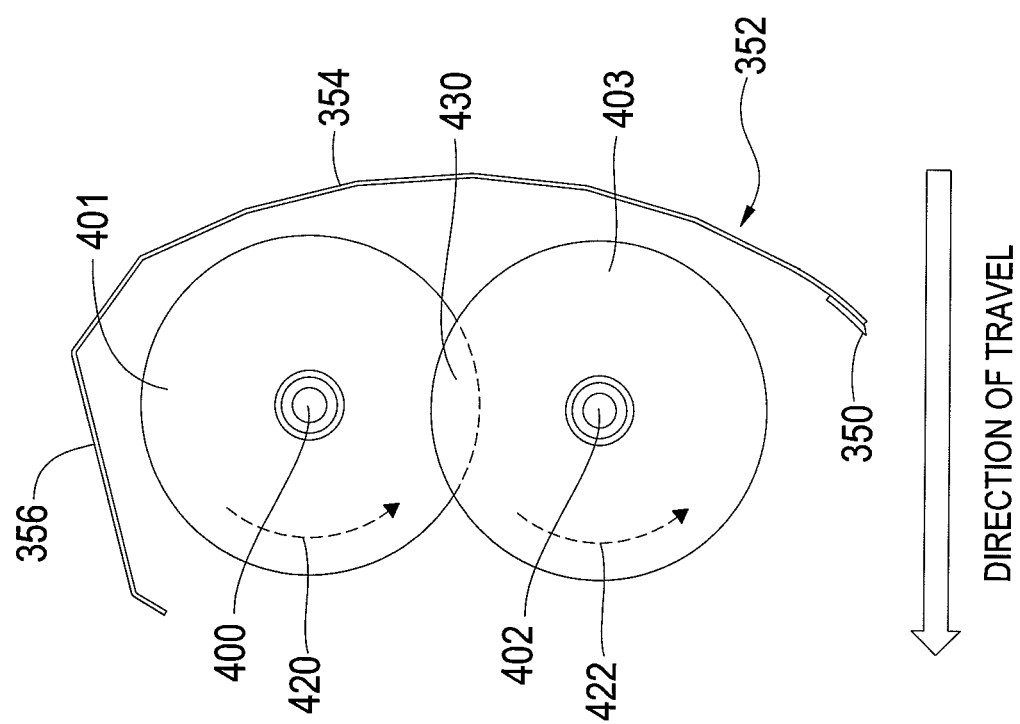
FIG. 8 is a cross-sectional view of a portion of the embodiment illustrated in FIG. 1.

When rotating, the augers 400, 402, with the assistance of their flighting 401, 403, laterally move the particulate material in front of the backstop 352 out the exit 364 of the end cap 362 to form the windrows. As shown in FIG. 8, the augers 400, 402 are configured to rotate in the same angular direction 420, 422 as the gauge wheels of the windrower machine 10 as the machine moves forward, thus the top of each auger 400, 402 moves away from the backstop 352, as shown in FIG. 8. By rotating in this angular direction, the augers 400, 402 urge the particulate material up the vertical portion 354 of the backstop 352, rather than throwing the particulate material forward as in other windrower machines. Taller windrows result as the particulate material exits the windrower machine at a greater height. Additionally, the augers 400, 402 are mounted such that the flighting 401 of one auger 400 overlaps or enters into the space 430 between the flighting 403 of the other auger 402. For example, using standard augers, the centers of the augers 400, 402 are mounted with 12 inches of one another, which leaves an overlap of 2 inches between their respective fighting 401, 403, as shown in FIG. 8. In the overlap area 430, the flighting 401 along the bottom of the top auger 400 moves in an opposite direction than the flighting 403 along the top of the bottom auger 402, which creates a shearing affect on the particulate material, breaking the clumped portions of the cake and hardpan clumped portions into smaller pieces. Additionally, the overlapping region 430 also helps the bottom auger 400 feed the particulate material to the upper auger 402, utilizing the entire height of the backstop 352, which reduces the load on the windrower machine 10 as well as increasing the height of the windrows produced.

The augers 400, 402 are mechanically driven at one end cap 360. As shown in FIG. 3, the augers 400, 402 are driven by a sprocket assembly 500 with each auger 400, 402 coupled to an auger gear 502, 504 associated on the opposite side of the end cap 360. The auger gears 502, 504 may be driven by a chain assembly 506 that engages with a driving gear 508. The driving gear 508 can be driven by a variety of means, as discussed below. As shown in FIG. 3, the chain assembly 506 may include two separate chains 506a, 506b which engage with a 2-1 gear 502. However, a single chain may be used in other embodiments of the invention. In addition, idle gears 510, 512 may assist the sprocket assembly 500 by preventing slack within the chain assembly 506. In the preferred embodiment of the present invention, the sprocket assembly 500 is sealed within a sprocket housing 520. The sprocket housing is preferably sealed on all sides to contain lubricating agents within the housing 520 to prevent fouling or burning out any of its components. A wall scraper 540 may be associated with the closed end cap 360 to prevent the windrower machine 10 from striking fully any walls or other protruding surfaces and to direct litter away from the wall towards the augers.

The driving gear 508 of the sprocket assembly 500 may be driven by a variety of different means. For example, as shown in FIGS. 1-4, the driving gear 508 is configured to be driven by a power take-off of the tractor 20 through the combination of a double cv driveshaft 600 and an 90° gearbox 610. The double cv driveshaft 600 includes a first end 602 and a second end 604. The first end 602 of the driveshaft 600 may be configured to engage a PTO of the tractor 20 with the second end 604 configured to engage a socketed-connection rod 612 of the 90° gearbox 610. The rod 612 is configured to engage and rotate a shaft 614 that extends from the gearbox 610 that is rotationally coupled to the driving gear 508. Activating the PTO of the tractor 20 rotates the cv driveshaft 600, which in turn engages the rod 612 of the gearbox 610 to drive the shaft 614 connected to the driving gear 508 that rotates the augers 400, 402. In the preferred embodiment of the present invention, the combination of the PTO driveshaft 600, gearbox 610 and driving gear 508 rotate the augers 400, 402 at approximately 400 rpms. While the augers may rotate through out a wide range of rpms, 400 rpms is preferred as this rate of rotation increases the speed at which the particulate material exits the windrower machine 10 while effectively breaking up the cake and hard pan.

The windrower machine 10 may also include chopper blades 700, 710 associated with the augers 400, 402. The chopper blades 700, 710 are coupled to the free ends of the augers 400, 402 in a parallel fashion, as shown in FIG. 1-4, and are configured to rotate with the augers. The chopper blades may include curved ends 702, 704, 712, 714 that are oriented at alternate angles from one another so that when the chopper blades 700, 710 rotate, a curved end 702 of the upper chopper blade 700 passes a curved end 714 of the lower chopper blade 710. The chopper blades 700, 710 and their respective curved ends 702, 704, 712, 714 further facilitate additional shredding and breaking of clumped portions of particulate material. In other embodiments of the present invention, the chopper blades 700, 710 may have no curved ends, but sharpened ends to provide the same assistance. The chopper blades 700 may also interact with a grill guard 720 associated with the free end of the upper auger 400. The grill guard 720 includes fixed extensions 722 spaced apart from one another. The fixed extensions 722 allow the grill guard to act as an auxiliary disrupter, preventing most large clumps of particulate material from exiting the windrower machine 10 before being broken-up to a smaller size by either the chopping blades and/or the augers. If any large clumps of particulate material remain, the combination of the chopping blades 700, 710 and the grill guard 720 ensure that the large clumps exit only at the lower auger 402. By exiting at the lower auger, the large clumps are prevented from resting on the exterior of the windrows. Instead, the large clumps are forced into the interior of the windrow and are exposed to the interior's higher temperatures. This exposure further dries out the large clumps, and makes them more likely to crumble with the windrow is turned or moved at a later date.

Figure 9:
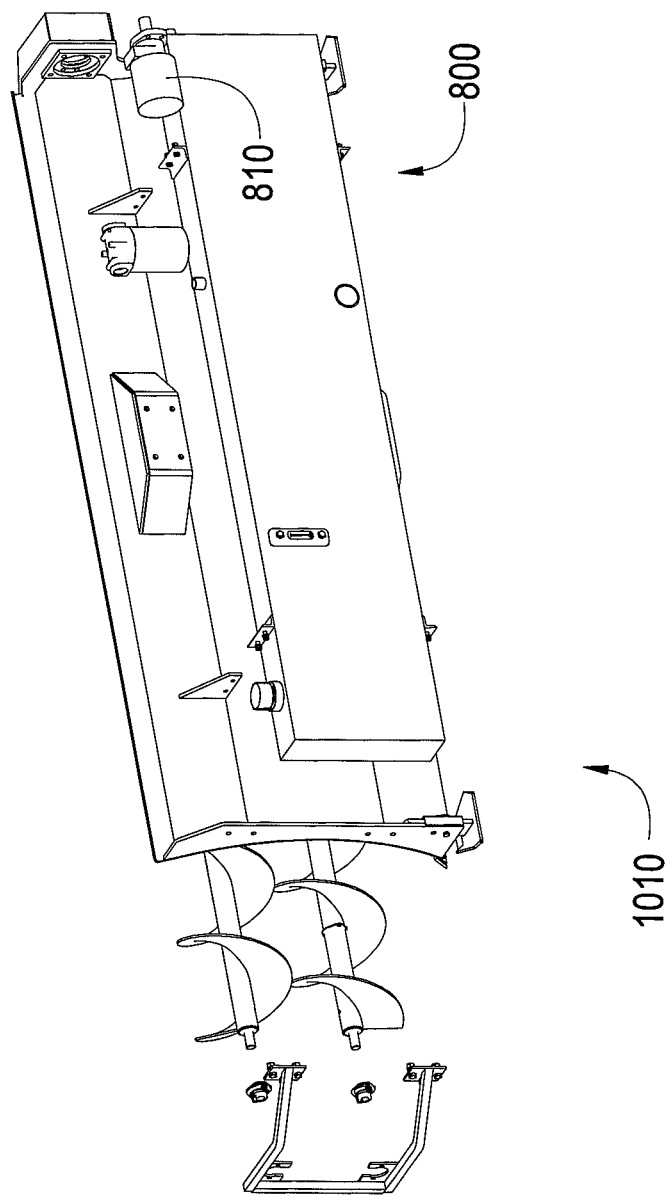
FIG. 9 is a perspective view of a windrower machine according to another embodiment of the present invention.
Figure 10:
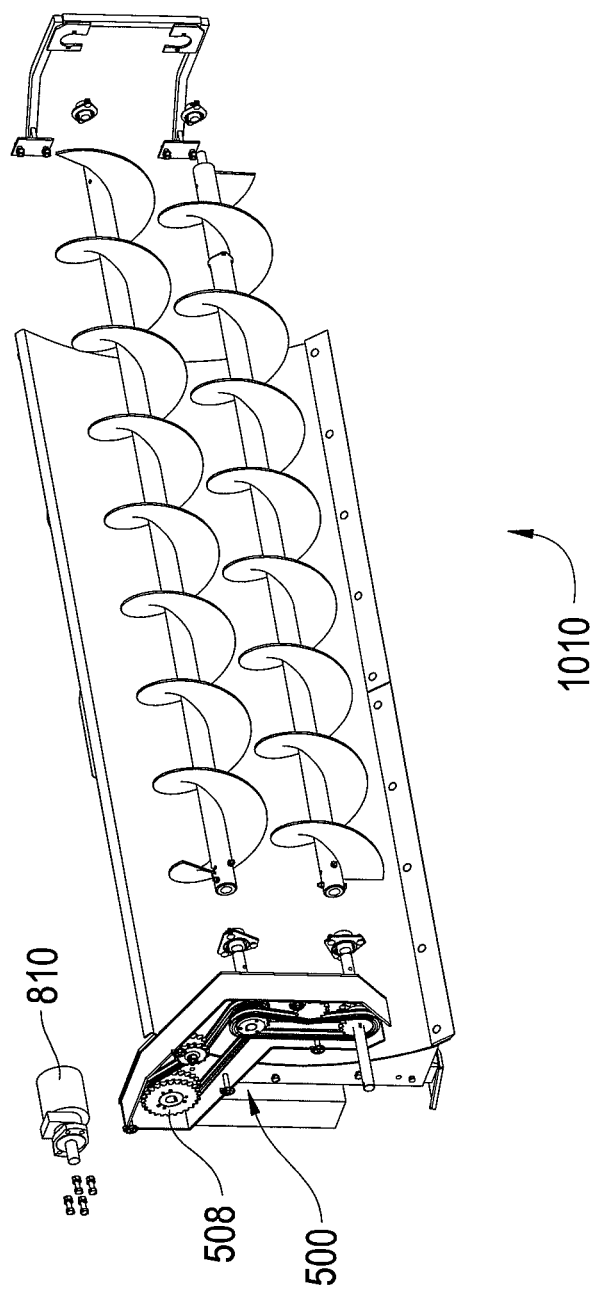
FIG. 10 is an exploded perspective view of the embodiment illustrated in FIG. 9.
Figure 11:
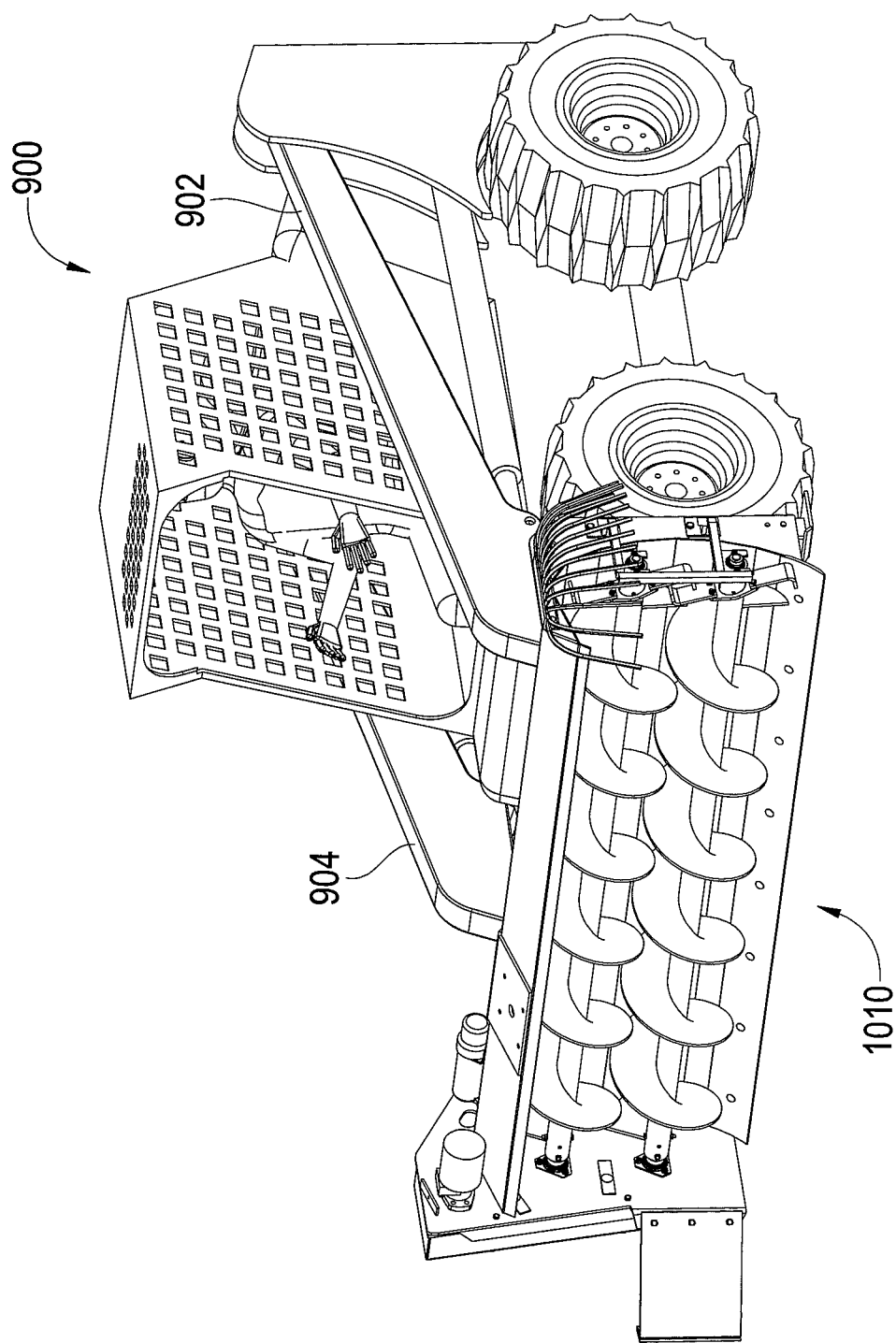
FIG. 11 is a perspective view of the embodiment illustrated in FIG. 9 engaged with a skid steer according to one embodiment of the present invention.

FIGS. 9-11 show another embodiment of a windrower machine 1010 that is driven by a hydraulic system 800. The other components of the windrower machine 1010 may function in the same ways as described above. The hydraulic system 800 takes the place of the PTO-driven driveshaft 600 and gearbox 610 assemblies. The hydraulic system 800 includes a hydraulic motor 810. The hydraulic motor 810 is configured to be driven conventionally by hydraulic pressure supplied by the prime mover or skid steer to which the windrower machine 1010 is coupled. The hydraulic motor 810 is coupled to the driving gear 508 of the sprocket assembly 500, which in turn rotates the augers as discussed above. The windrower machine 1010 may be mounted to a variety of movers in a variety of positions that were not available previously available due to size and power-source considerations. For example, the hydraulically-powered windrower machine 1010 may be used with a skid steer 900 as shown in FIG. 9. The windrower machine is mounted to the lift arms 902, 904 of skid steer 900. The lift arms 902, 904 can control the position of the windrower machine, placing the blade at a variety of angles without the need of the hitch frame, turning system, and height adjustment mechanisms discussed in the other embodiments above. The hydraulic system of the selected mover 900 is connected to the hydraulic system 800 of the windrower 1010 to provide power to the augers.

It is to be understood that the forms of the apparatus shown are preferred embodiments thereof and that various changes and modifications may be made therein without departing from the spirit of the invention or scope as defined in the following claims.

What is claimed is:

1. An apparatus for creating windrows from poultry litter, comprising:
    a) a frame selectively attached to a prime mover for urging said frame through at least one layer of poultry litter previously accumulated on an underlying surface, said frame supporting a substantially vertically oriented backstop, said backstop including a blade for engaging said at least one layer of poultry litter proximate said underlying surface to lift a portion of said previously accumulated poultry litter;
    b) first and second rotationally driven shafts mounted on said frame extending along parallel horizontal axes at a height above said underlying surface and proximate said vertically oriented backstop, each of said rotationally driven shafts having at least one radially extending member oriented substantially helically there along, said first and second rotationally driven shafts spaced apart from each other by less than the diameter of said radially extending members with said radially extending members overlapping in intermeshing relationship to create a shearing effect on poultry litter carried there between and urging said poultry litter laterally along said vertically oriented backstop to discharge said poultry litter into windrows; and
    c) a grill guard associated with a first end of the first rotationally driven shaft and extending laterally beyond said backstop, said grill guard including fixed extensions spaced apart from one another and from the end of the first shaft so as to disrupt and deflect larger clumps of said poultry litter as said poultry litter is urged outwardly by rotation of the first shaft and the second shaft,
    wherein said blade extends lower than the at least one radially extending member on either of said first and second rotationally driven shafts to lift the portion of said previously accumulated poultry litter and to urge the lifted portion of said poultry litter to interact with said radially extending members.

2. The apparatus of claim 1, wherein the first and second rotationally driven shafts are configured to rotate in the same angular direction to urge said poultry litter upwardly towards along said backstop.

3. The apparatus of claim 2, wherein the first rotationally driven shaft is mounted substantially above the second rotationally driven shaft, and the at least one radially extending member of the first rotationally driven shaft is a substantially continuous flighting that helically extends along the first shaft.

4. The apparatus of claim 1, wherein the first rotationally driven shaft is mounted substantially above the second rotationally driven shaft, and the at least one radially extending member of the first rotationally driven shaft is a substantially continuous flighting that helically extends along said first rotationally driven shaft.

5. The apparatus of claim 4, wherein the at least one radial extension of the second rotatably driven shaft is a substantially continuous flighting that helically extends along said second rotatably driven shaft in intermeshing relationship with said substantially continuous helical flighting that helically extends along said first rotatably driven shaft to urge said poultry litter horizontally along said vertically extending backstop.

* * * * *